US012454452B2

(12) United States Patent
Lundberg et al.

(10) Patent No.: US 12,454,452 B2
(45) Date of Patent: Oct. 28, 2025

(54) APPARATUS FOR DISPENSING A BEVERAGE

(71) Applicant: Grad ApS, Copenhagen (DK)

(72) Inventors: Max Tomas Lundberg, Copenhagen (DK); Per Bergelin, Malmö (SE); Anders Bruus, Copenhagen (DK); Michael Skovbjerg, Copenhagen (DK); Ann-Marie Finn, Copenhagen (DK); Kenneth Holck Jakobsen, Solrød Strand (DK)

(73) Assignee: Grad ApS, Copenhagen (DK)

( * ) Notice: Subject to any disclaimer, the term of this patent is extended or adjusted under 35 U.S.C. 154(b) by 580 days.

(21) Appl. No.: 17/569,670

(22) Filed: Jan. 6, 2022

(65) Prior Publication Data

US 2022/0219966 A1 Jul. 14, 2022

Related U.S. Application Data

(60) Provisional application No. 63/135,208, filed on Jan. 8, 2021.

(51) Int. Cl.
*B67D 3/00* (2006.01)
*F25D 31/00* (2006.01)

(52) U.S. Cl.
CPC ......... *B67D 3/0077* (2013.01); *B67D 3/0003* (2013.01); *B67D 3/0009* (2013.01); *B67D 3/0025* (2013.01); *B67D 3/0032* (2013.01); *B67D 3/0035* (2013.01); *B67D 3/0093* (2013.01); *F25D 31/002* (2013.01)

(58) Field of Classification Search
CPC .... B67D 3/007; B67D 3/0003; B67D 3/0009; B67D 3/0032; B67D 3/0035; B67D 3/0093; F25D 31/002
See application file for complete search history.

(56) References Cited

U.S. PATENT DOCUMENTS 3,881,547 A * 5/1975 Lavering ................. H01J 19/36
165/80.3
4,145,291 A * 3/1979 Console .................. C02F 1/505
210/474

(Continued)

FOREIGN PATENT DOCUMENTS

CN       2381243 Y  *  6/2000
CN   201119247 A  *  9/2008

(Continued)

OTHER PUBLICATIONS

Jianrong et al., Liquid Cooling Auxiliary Heat Radiation Device, Sep. 17, 2008, CN201119247Y, Whole Document (Year: 2008).*

(Continued)

*Primary Examiner* — Larry L Furdge
(74) *Attorney, Agent, or Firm* — DiBerardino McGovern IP Group LLC

(57) ABSTRACT

Apparatus for dispensing a beverage in which a bottle containing the beverage is placed in a cradle and a portion of the beverage flows into a heat exchanger in which the beverage is heated or cooled to a desired temperature. The heat exchanger may be divided into at least two zones with the beverage being heated or cooled to the desired temperature in an inlet zone and the beverage being maintained at the desired temperature in an outlet zone.

34 Claims, 13 Drawing Sheets

(56) References Cited

U.S. PATENT DOCUMENTS

| | | | |
|---|---|---|---|
| 4,164,851 A | | 8/1979 | Bryant |
| 4,470,008 A | * | 9/1984 | Kato .................. G01R 27/2605 |
| | | | 324/683 |
| 4,681,611 A | | 7/1987 | Bohner |
| 4,704,872 A | | 11/1987 | Jones |
| 4,823,554 A | | 4/1989 | Trachtenberg et al. |
| 4,891,949 A | | 1/1990 | Caldarola |
| 4,913,713 A | | 4/1990 | Bender et al. |
| 4,993,229 A | * | 2/1991 | Baus .................... B67D 3/0029 |
| | | | 62/394 |
| 5,029,446 A | | 7/1991 | Suzuki |
| 5,409,547 A | | 4/1995 | Watanabe et al. |
| 5,513,496 A | * | 5/1996 | Stokes ................. B67D 3/0029 |
| | | | 62/457.4 |
| 5,634,343 A | | 6/1997 | Baker |
| 5,699,669 A | * | 12/1997 | Gebhard ................. F25B 21/02 |
| | | | 165/47 |
| 5,720,171 A | | 2/1998 | Osterhoff et al. |
| 5,862,669 A | | 1/1999 | Davis et al. |
| 6,003,318 A | | 12/1999 | Busick et al. |
| 6,096,032 A | | 8/2000 | Rowland |
| 6,119,461 A | | 9/2000 | Stevick et al. |
| 6,141,969 A | | 11/2000 | Launchbury et al. |
| 6,338,252 B1 | | 1/2002 | Calderaio |
| 6,351,964 B1 | | 3/2002 | Brancheau |
| 6,640,551 B1 | | 11/2003 | Slone et al. |
| 6,732,533 B1 | | 5/2004 | Giles |
| 7,089,749 B1 | | 8/2006 | Schafer |
| 7,334,414 B2 | | 2/2008 | Park et al. |
| 7,934,384 B2 | | 5/2011 | Tuszkiewicz et al. |
| 8,397,519 B2 | | 3/2013 | Loibl et al. |
| 8,468,836 B2 | | 6/2013 | Tuszkiewicz et al. |
| 8,512,430 B2 | | 8/2013 | Manahan et al. |
| 8,727,179 B2 | | 5/2014 | Colelli et al. |
| 9,752,808 B2 | | 9/2017 | Nakamura et al. |
| 9,975,462 B2 | | 5/2018 | Doi |
| 10,113,791 B2 | | 10/2018 | Wenji et al. |
| 10,350,108 B1 | * | 7/2019 | Rittman, III ............... A61F 7/02 |
| 2003/0031777 A1 | | 2/2003 | Lucatello |
| 2004/0035119 A1 | | 2/2004 | Slone et al. |
| 2004/0040977 A1 | * | 3/2004 | Mathues .............. B67D 1/1252 |
| | | | 222/64 |
| 2005/0217835 A1 | * | 10/2005 | Amstutz .................... F28F 9/22 |
| | | | 165/159 |
| 2005/0274119 A1 | | 12/2005 | Lee |
| 2006/0117760 A1 | | 6/2006 | Pieronczyk et al. |
| 2006/0175355 A1 | * | 8/2006 | Glucksman .......... B67D 1/0425 |
| | | | 222/209 |
| 2006/0188418 A1 | | 8/2006 | Park et al. |
| 2006/0218937 A1 | | 10/2006 | Park et al. |
| 2006/0260324 A1 | | 11/2006 | Luzaich |
| 2007/0193280 A1 | | 8/2007 | Tuszkiewicz et al. |
| 2008/0148753 A1 | | 6/2008 | Welker et al. |
| 2008/0230025 A1 | * | 9/2008 | Ikihara .................. F01L 1/3442 |
| | | | 464/2 |
| 2009/0056363 A1 | * | 3/2009 | Lee ........................... F25C 5/22 |
| | | | 62/389 |
| 2010/0058776 A1 | | 3/2010 | Loibl et al. |
| 2010/0115969 A1 | | 5/2010 | Tuszkiewicz et al. |
| 2010/0258268 A1 | | 10/2010 | Li |
| 2011/0011099 A1 | | 1/2011 | Linder |
| 2012/0217772 A1 | | 8/2012 | Tang |
| 2012/0248141 A1 | * | 10/2012 | Sano .................... B67D 3/0003 |
| | | | 222/67 |
| 2012/0266609 A1 | | 10/2012 | Liu et al. |
| 2014/0069111 A1 | | 3/2014 | Campbell et al. |
| 2014/0157794 A1 | | 6/2014 | McGann |
| 2014/0165621 A1 | | 6/2014 | Boarman et al. |
| 2014/0190185 A1 | | 7/2014 | Bell et al. |
| 2014/0250919 A1 | * | 9/2014 | Obermaier ............ F25D 31/002 |
| | | | 62/3.64 |
| 2015/0230631 A1 | | 8/2015 | Nuttall et al. |
| 2015/0273560 A1 | | 10/2015 | Pilon et al. |
| 2015/0323246 A1 | | 11/2015 | Spivey et al. |
| 2016/0018115 A1 | | 1/2016 | Arjomand |
| 2016/0018138 A1 | | 1/2016 | Liptak et al. |
| 2016/0236605 A1 | | 8/2016 | Doi |
| 2016/0281039 A1 | | 9/2016 | Narasimhan et al. |
| 2016/0282040 A1 | | 9/2016 | Wenji et al. |
| 2016/0372805 A1 | * | 12/2016 | Kim .................... H01M 50/204 |
| 2017/0102181 A1 | | 4/2017 | Arjona Esteves |
| 2017/0113870 A1 | | 4/2017 | Looker |
| 2017/0356686 A1 | | 12/2017 | Xue et al. |
| 2018/0040795 A1 | | 2/2018 | Lam et al. |
| 2018/0105410 A1 | | 4/2018 | Kim et al. |
| 2018/0106533 A1 | | 4/2018 | Lauchnor |
| 2018/0164034 A1 | | 6/2018 | Banks |
| 2018/0235392 A1 | | 8/2018 | Yuki et al. |
| 2018/0252446 A1 | | 9/2018 | Place |
| 2019/0154313 A1 | | 5/2019 | Verellen |
| 2019/0345018 A1 | * | 11/2019 | Garcia ................. B67D 3/0093 |
| 2021/0063081 A1 | | 3/2021 | Tachibana et al. |

FOREIGN PATENT DOCUMENTS

| | | | |
|---|---|---|---|
| CN | 201548014 U | | 8/2010 |
| CN | 101089438 B | * | 12/2011 |
| DE | 102006021459 A1 | | 11/2007 |
| EP | 1800070 B1 | * | 12/2008 |
| EP | 3301381 A1 | | 4/2018 |
| FR | 2900724 A1 | | 11/2007 |
| JP | 2000025898 A | * | 1/2000 |
| JP | 2001041630 A | | 2/2001 |
| JP | 2004212029 A | | 7/2004 |
| JP | 2007132572 A | * | 5/2007 |
| KR | 20130097920 A | | 9/2013 |
| WO | 2011150018 A1 | | 12/2011 |

OTHER PUBLICATIONS

Kitamura et al., Draft Beer Dispenser, Jan. 25, 2000, JP2000025898A, Whole Document (Year: 2000).*

Wang, Water Distributor, Dec. 7, 2011, CN101089438B, Whole Document (Year: 2011).*

Noguchi, Refrigerator, May 31, 2007, JP2007132572A, Whole Document (Year: 2007).*

Zhang, Boiling Drinking Water Apparatus Against Secondary Pollution, Jun. 7, 2000, CN2381243Y, Whole Document (Year: 2000).*

Liccioni, Small-Sized Bottled Water Station, Dec. 17, 2008, EP1800070B1, Whole Document (Year: 2008).*

Ferrotec. (Nov. 13, 2008). Ferrotec Multi-stage Deep Cooling Peltier Thermoelectric Cooler Modules. Retrieved Aug. 2, 2019, from https://thermal.ferrotec.com/products/peltier-thermoelectric-cooler-modules/deep-cooling/ (Year: 2008).

Fargo Controls, Inc. (Nov. 6, 2008). Operating Principles for Inductive Proximity Sensors. Retrieved Aug. 2, 2019, from https://www.fargocontrols.com/sensors/inductive_op.html (Year: 2008).

* cited by examiner

APPARATUS FOR DISPENSING A BEVERAGE

CROSS-REFERENCE TO RELATED APPLICATIONS

This application claims the benefit of U.S. Provisional Application No. 63/135,208, filed Jan. 8, 2021, which is incorporated by reference herein in its entirety. This application is related to U.S. patent application Ser. No. 14/975,464 filed Dec. 18, 2015, U.S. patent application Ser. No. 15/203,496 filed Jul. 6, 2016, and U.S. patent application Ser. No. 16/446,351 filed Nov. 7, 2019, the specifications of which are all hereby incorporated by reference herein in their entirety.

FIELD

The present disclosure relates devices for dispensing beverages. An example of such a system is one that would be used in the commercial establishment such as a bar or restaurant for dispensing chilled beverages for sale to a customer. Such a system could also be used in a consumer setting.

BACKGROUND

There are circumstances in which it would be advantageous to be able to dispense a temperature controlled, e.g., chilled beverage very quickly. For example, in a commercial hospitality establishment it would be extremely useful to be able dispense a chilled beverage relatively rapidly and easily. A device for effecting such dispensing is, however, difficult to implement in practice because of the amount of time it takes using conventional systems to cool the beverage down to a very cold temperature, e.g., at or near the freezing point of water. It is in such a context that the need for the disclosed subject matter arises.

SUMMARY

The following presents a simplified summary of one or more embodiments in order to provide a basic understanding of the embodiments. This summary is not an extensive overview of all contemplated embodiments and is not intended to identify key or critical elements of all embodiments nor set limits on the scope of any or all embodiments. Its sole purpose is to present some concepts of one or more embodiments in a simplified form as a prelude to the more detailed description that is presented later.

According to an aspect of an embodiment there is disclosed an apparatus for dispensing a liquid, the apparatus comprising a housing including a cradle structure adapted to receive a container containing the liquid placed in the cradle structure through a liquid inlet, and an inlet in the cradle structure arranged to receive liquid from the container; an outlet arranged to dispense the liquid from the housing, a heat exchanger arranged within the housing and divided into a first zone and a second zone with the first zone being in fluid communication with the inlet and the second zone being in fluid communication with the outlet, the first zone being in limited fluid communication with the second zone, and a temperature control element in thermal communication with the first zone and with the second zone, the first zone being adapted to alter a temperature of the liquid in the first zone to a temperature substantially equal to a target temperature and the second zone being adapted to maintain the liquid from the first zone at the temperature substantially equal to the target temperature. The first zone may be in limited fluid communication with the second zone through a single port between the first zone and the second zone and wherein the first zone may comprise a plurality of substantially parallel fins with adjacent pairs of fins defining channels open at both ends therebetween to define a plurality of substantially parallel channels directing liquid in the first zone from the inlet to the single port in parallel. The second zone may comprise a second plurality of substantially parallel fins with adjacent pairs of fins defining channels open at both ends therebetween to define a second plurality of substantially parallel channels directing liquid in the second zone from the single port to the inlet in parallel. The first zone may be in limited fluid communication with the second zone through a single port between the first zone and the second zone and wherein the first zone may comprise a plurality of substantially parallel fins with adjacent pairs of fins defining channels therebetween to define a plurality of channels directing liquid in the first zone from the inlet to the single port, with a first channel communicating with the inlet, a second channel communicating with the single orifice, a plurality of intervening channels communicating only with an adjacent channel to define a serpentine path.

The second zone may comprise a second plurality of substantially parallel fins with adjacent pairs of fins defining channels therebetween to define a second plurality of channels directing liquid in the second zone from the single port to the outlet, with a first channel communicating with the single port, a second channel communicating with the outlet, and a plurality of intervening channels communicating only with an adjacent channel to define a serpentine path. The first zone may be in limited fluid communication with the second zone through a single port between the first zone and the second zone and wherein the first zone may comprise a first set of fins arranged substantially parallel to one another and substantially perpendicular to a direction of flow from the inlet, and a second set of fins arranged substantially parallel to one another and substantially perpendicular to a direction of flow from the inlet, the first set and the second set being interdigitated to form a serpentine path between the inlet and the single port. The second zone may comprise a third set of fins arranged substantially parallel to one another and substantially perpendicular to a direction of flow out of the outlet, and a fourth set of fins arranged substantially parallel to one another and substantially perpendicular to a direction of flow out of the outlet, the third set and the fourth set being interdigitated to form a serpentine path between the single port and the outlet. The heat exchanger may comprise a plurality of fins having corrugated surfaces to increase a surface area of the fins. The apparatus may further comprise a locking mechanism arranged to prevent unauthorized removal of the container from the cradle.

The first temperature control element may comprise a first thermoelectric cooling element and the second temperature control element may comprise a second thermoelectric cooling element. The apparatus may further comprise a battery pack for supplying power to the first thermoelectric cooling element and the second thermoelectric cooling element. The apparatus may further comprise a spot cooling thermoelectric cooling element in thermal communication with the outlet to provide directed cooling of liquid exiting the outlet. The heat exchanger may have an internal volume in a range of about 0.1 liter to about 1 liter. A ratio of an internal volume of the first zone to an internal volume of the second zone may be about 1:1. A ratio of an internal volume of the first zone to an internal volume of the second zone may be about 3:2.

The apparatus may further comprise a detector arranged to detect a characteristic of a container placed in the cradle and wherein the inlet may comprise a valve adapted to selectably permit liquid from the container to enter the first zone based on the characteristic. The outlet may comprise a valve arranged within the housing and positioned to avoid retention of liquid outside of the second zone. The inlet may be arranged at a position above and aligned with the outlet, the inlet and the outlet together defining a first vertical axis, the first temperature control element and the second temperature control element being arranged vertically in a stack having a second vertical axis parallel to the first vertical axis.

The apparatus may further comprise a spill mat arranged below the outlet. The outlet may comprise a lever adapted to be operable with one hand. The outlet may comprise a lever having an elastic pad. The further comprising a volume detector arranged to detect a detected volume of liquid in a container inserted into the cradle and an indicator adapted to provide an indication of the detected volume. The indicator may comprise at least one LED.

The apparatus may further comprise a temperature detector arranged to detect a detected temperature of liquid in the second zone and an indicator adapted to provide an indication of the detected temperature. The indicator may comprise at least one LED. The apparatus may further comprise an operational status detector arranged to detect a detected operational status of the apparatus and an indicator adapted to provide an indication of the detected operational status. The indicator may comprise at least one LED. The apparatus may further comprise a data collection module adapted to gather and store data pertaining to operational parameters of the apparatus and a communications module arranged to receive data from the data collection module and adapted to communicate the data to an external device. The apparatus may further comprise a communications module arranged to receive control data from an external device. The apparatus may further comprise a touch sensitive sensor for imputing control data. The outlet further may comprise a module for controlling an amount of liquid dispensed with each actuation of the outlet. The outlet further may comprise a sensor adapted to detect a presence of a vessel for receiving the liquid and wherein the outlet may be adapted to not dispense liquid unless a vessel may be present. The outlet further may comprise a sensor adapted to detect a presence of a vessel for receiving the liquid and wherein the outlet may be adapted to dispense liquid automatically upon detecting the vessel. The apparatus may further comprise an air cooling unit arranged to cool the first temperature control element and the second temperature control element. The air cooling unit may comprise an air inlet and an air outlet separated from the air inlet by a barrier. The air inlet may comprise a first set of fins and the air outlet may comprise a second set of fins wherein the first set of fins and the second set of fins are angled away from one another.

The apparatus may further comprise a power management system adapted to selectably cause the apparatus to operate in a power cooling mode to increase cooling performance. The outlet may comprise an electrically actuated valve adapted to be closed when the apparatus is off. The housing may comprise a thermally insulating material. The thermally insulating material may comprise a plastic material. The second zone may have a bottom surface which is sloped to promote more complete drainage of the second zone. The temperature control elements may have a hot side and a cold side separated by insulation, and wherein the heat exchanger has a raised surface to increase a thickness of the insulation between cold and hot side.

The apparatus may further comprise a horizontal drain tank in fluid communication with the cradle structure. The horizontal drain tank may have a volume in the range of 2 cl to 20 cl.

The apparatus may further comprise a sensor for sensing a type of liquid in a container inserted in the cradle. The sensor may comprise an IR sensor. The cradle may be in fluid communication with a buffer tank arranged to catch liquid escaping the bottle.

Further embodiments, features, and advantages of the subject matter of the present disclosure, as well as the structure and operation of the various embodiments are described in detail below with reference to accompanying drawings.

BRIEF DESCRIPTION OF THE DRAWINGS

The accompanying drawings, which are incorporated herein and form part of the specification, illustrate the methods and systems of embodiments of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements.

Figure 1:
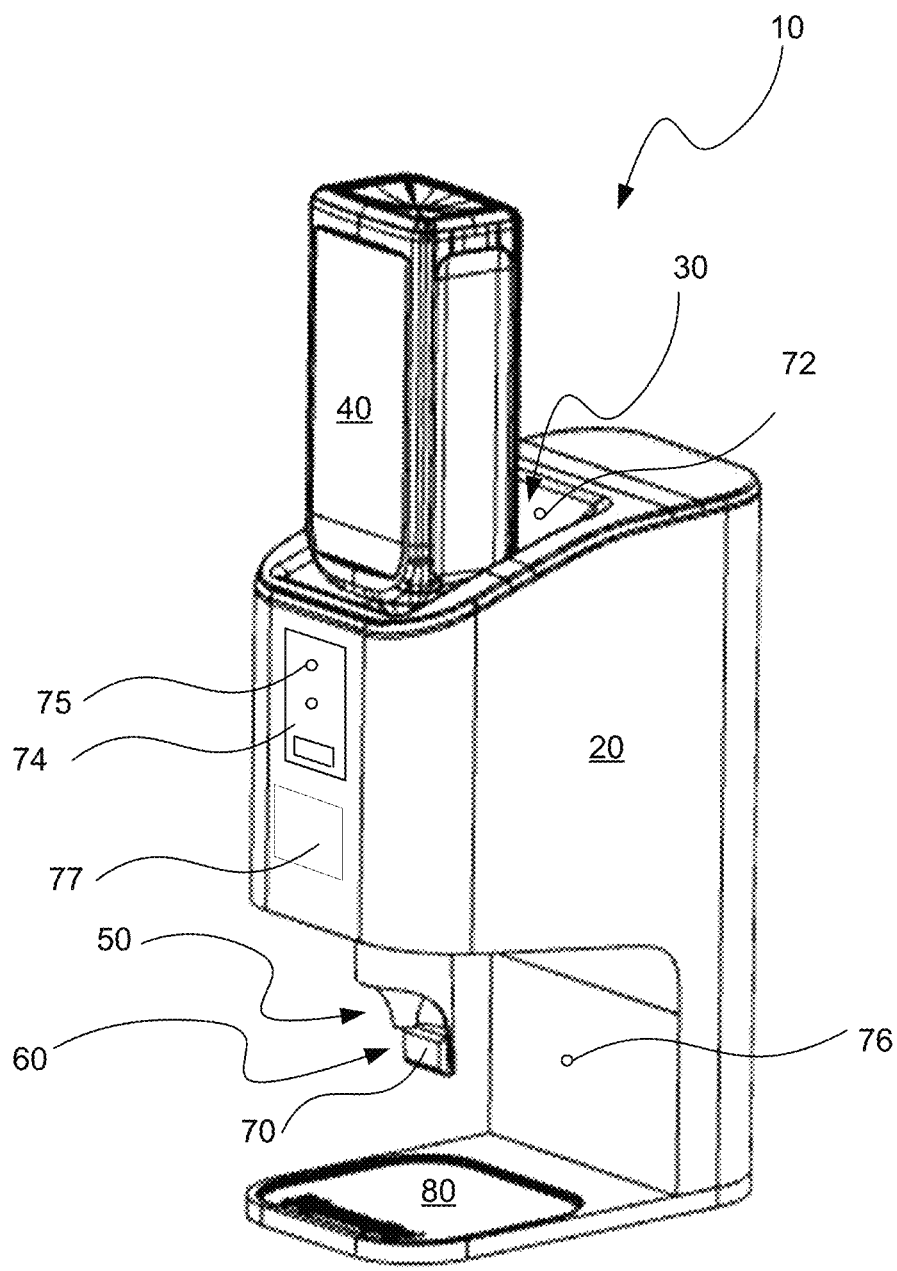
FIG. 1 is a perspective view of a beverage dispensing system according to one aspect of an embodiment.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments.

The embodiment(s) described, and references in the specification to "one embodiment," "an embodiment," "an example embodiment," "an exemplary embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 3:
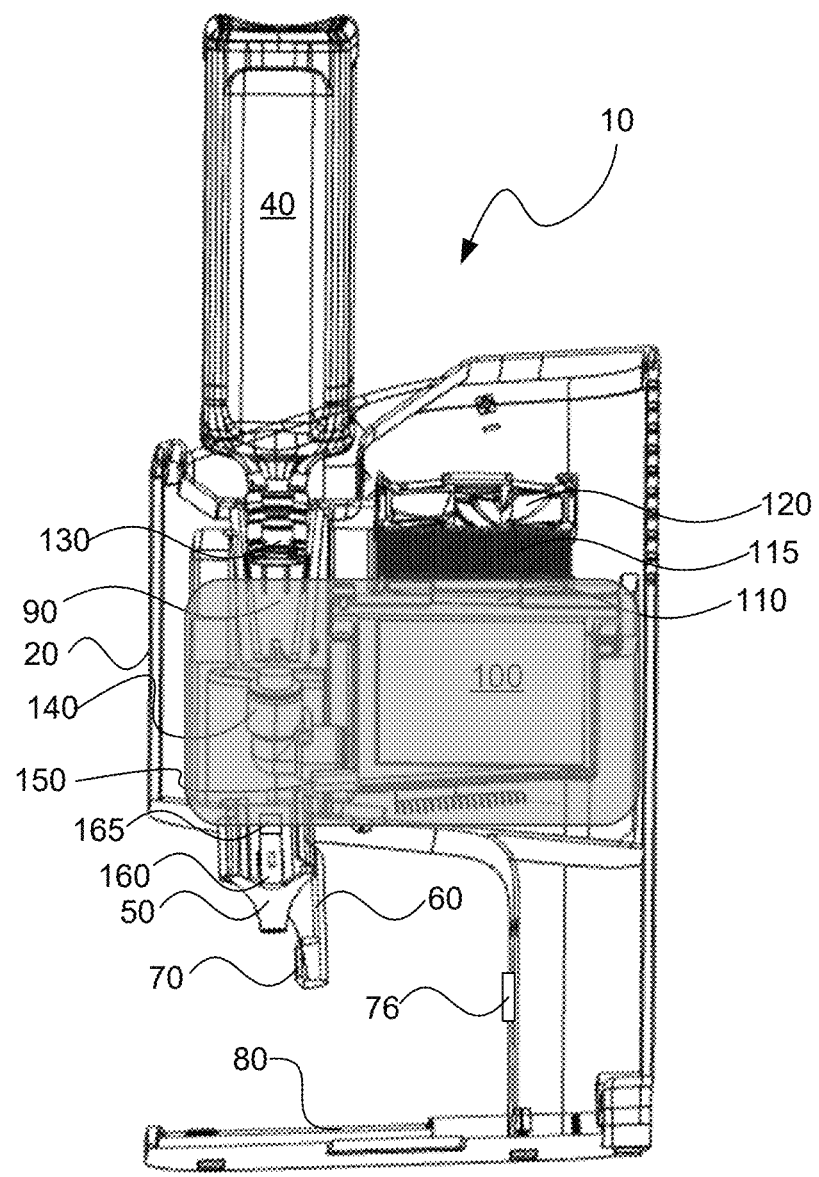
FIG. 3 is another cutaway view of a beverage dispensing system according to one aspect of an embodiment.

With respect to FIG. 1, there is shown a beverage dispensing system 10 which includes a housing 20 and structure in the housing 20 defining a cradle 30. The housing 20 may be made of an insulating material such as a plastic. The interior of the housing 20 can then serve as a temperature controlled environment. This is useful, for example, to keep the liquid about to exit housing 20 at a controlled temperature rather than allowing the liquid to assume an ambient temperature. The cradle 30 is configured to receive a bottle 40 containing a liquid such as a beverage. In the embodiment shown, cradle 30 is configured to receive the bottle 40 while the bottle 40 is vertical and inverted. Also shown in FIG. 1 is a nozzle 50 with an actuator or lever 60 which a user will move in order to cause liquid to flow out of the nozzle 50. The lever 60 includes a rubber pad 70 to prevent slippage. In some embodiments, the lever 60 is not in mechanical contact with the valve that controls the flow of liquid out of the nozzle 50 and instead contacts a concealed switch controlling an electronically controlled valve 155 (FIG. 3). Also shown in FIG. 1 is a mat 80 for capturing spillage from the nozzle 50. The mat 80 in some embodiments has a textured or "angled" peak-and-valley contact surface to disperse liquid falling on the mat 80 in the valleys between the peaks.

FIG. 1 also shows various sensors including a sensor 72 arranged to detect whether a bottle 40 is in the cavity 30 and which also may detect a level of liquid within the bottle 40. FIG. 1 also shows and a sensor 76 arranged to detect whether a vessel such as a glass is present beneath the nozzle 50. FIG. 1 also shows a panel 74 including LED lights 75 capable of displaying information regarding various conditions such as the operational status of the beverage dispensing system 10 as will be described more fully below. Show, the panel 74 and also contain a touch sensitive panel 77 for controlling the operation of the beverage dispensing system 10.

Figure 2:
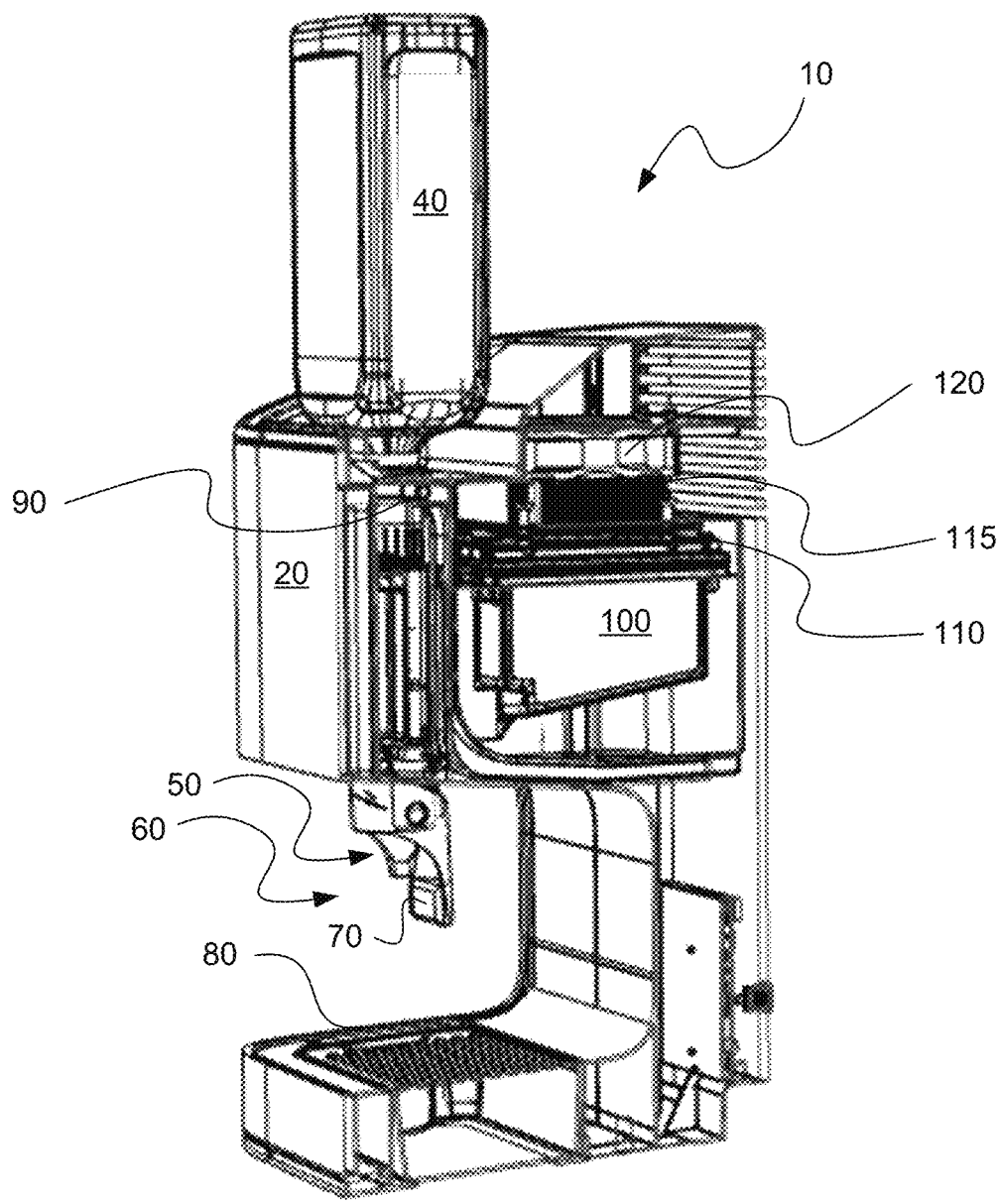
FIG. 2 is a cutaway view of a beverage dispensing system according to one aspect of an embodiment.

With reference now to FIG. 2, there is shown a partially cutaway view of the beverage dispensing system 10 of FIG. 1. As shown, the outlet of the inverted bottle 40 is received by a mating structure 90 which is in fluid communication with the interior of a heat exchanger 100 described more detail below. The heat exchanger 100 is in thermal communication with a temperature control element 110. As used here and elsewhere in this specification, the phrase "thermal communication" is intended to mean that there is a path along which heat can flow.

As can be seen in FIG. 2, the bottom of the heat exchanger 100 is sloped downward from the back of the heat exchanger 100 toward the front to promote drainage. A heat sink 115 absorbs heat from the temperature control element 110. Also visible in FIG. 2 is a fan 120 for venting waste heat from the temperature control element 110 via the heat sink 115.

As can be seen in FIG. 3, the mating structure 90 includes a structure 130 for mating with the bottle 40 and an inlet 140 of the heat exchanger 100. Also visible in FIG. 3 is an outlet 150 from the heat exchanger 100 from which a liquid which has achieved a target temperature in the heat exchanger 100 flows to the nozzle 50. As shown, the nozzle 50 includes an electronically controlled valve 155 which serves to control the amount of a pour of the beverage dispensing system 10 and also to serve as a cut off to prevent the flow of liquid out of the beverage dispensing system 10 when it is not powered. The electronically controlled valve 160 can also be provided with its own thermoelectric cooler 165 to provide for spot cooling of the liquid before exiting the nozzle 50 to ensure that the dispensed liquid is at the desired temperature. The spot cooler 165 can also be used to cool the sloped section of the container and the pipe leading to the valve. For some applications it may be preferred to have most of the volume of system upstream of the valve 155 within the housing 20 to avoid having any significant volume of liquid retained outside of the area that is thermally controlled and insulated. Also, for some applications it may be preferred to have some or all of the components of the tap system be removable to facilitate cleaning and maintenance, for example, such as being installed with push-in fittings. As will be appreciated by one of ordinary skill in the art, the arrangement of the lever 60 in conjunction with the nozzle 50 permits one-handed operation.

It will be noted that in the embodiment shown the mating structure 90, the inlet 140, and the nozzle 50 are essentially colinear along a vertical axis. This compact arrangement reduces the footprint of the beverage dispensing system 10. Also visible in FIG. 3 is the sensor 76 arranged to detect whether a vessel such as a glass is present beneath the nozzle 50. The signal from this sensor 76 may be used to ensure that the beverage dispensing system 10 does not permit liquid to exit the nozzle 50 unless a vessel such as a glass is present. The sensor 76 may also be used to determine the presence of the vessel to effectively permit automatic operation without the need for an operator to move a mechanical actuator. The shaded area indicates an insulated region having a temperature effectively controlled by temperature control element 110.

Figure 4:
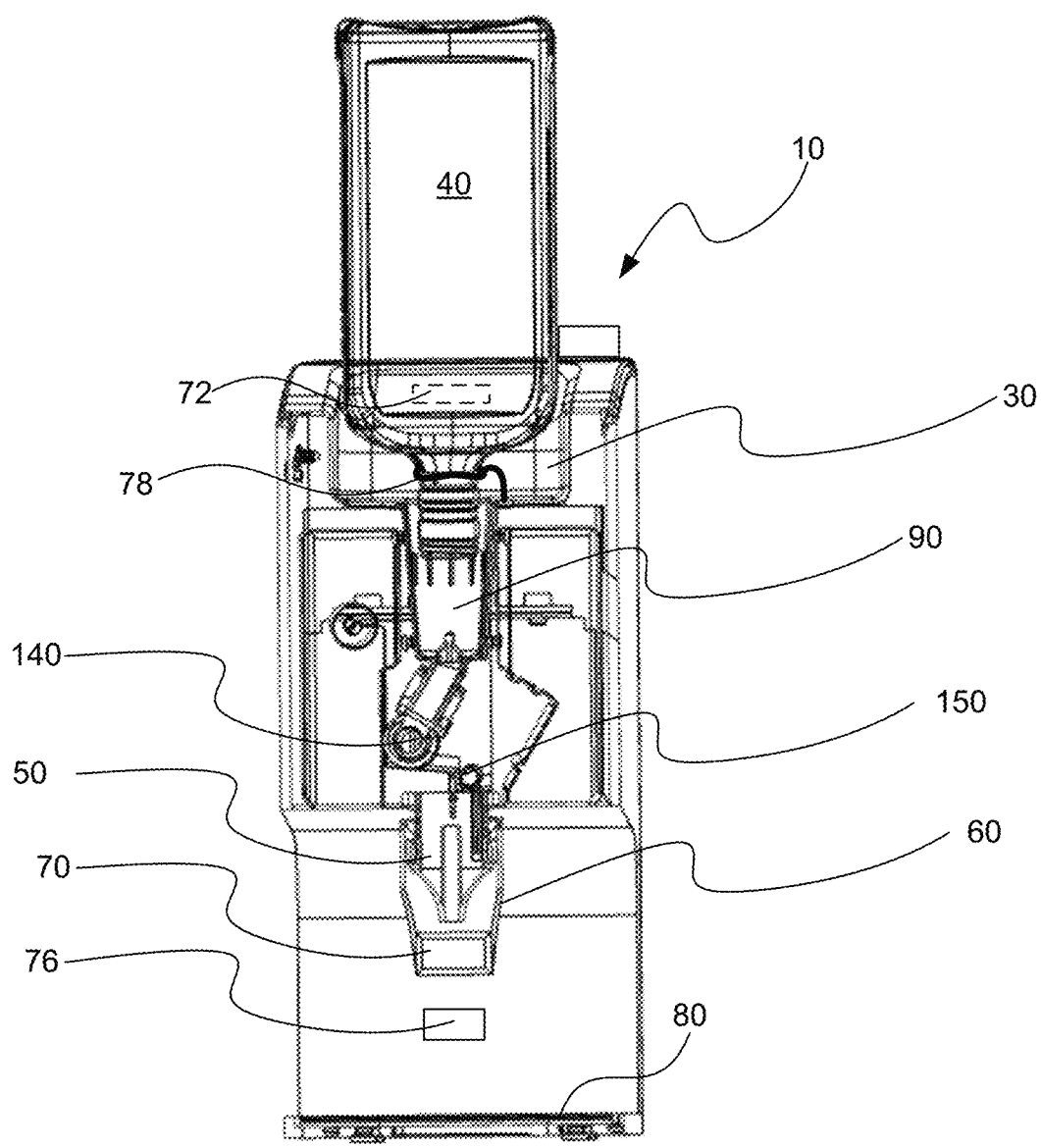
FIG. 4 is another cutaway view of a beverage dispensing system according to one aspect of an embodiment.

FIG. 4 is a partially cutaway view from the front of the beverage dispensing system 10. As can be seen in FIG. 4, the bottle 40 is nested into the cradle structure 30. The opening of the bottle 40 mates into a mating structure 90 from which a liquid flows through the inlet 140 into the heat exchanger 100 (not shown in FIG. 4 but visible in other figures). Also shown in phantom in FIG. 4 behind the bottle 40 is the sensor 72 which can provide an indication of a level of liquid in the bottle 40. The sensor 72 can also be configured to determine the presence or absence of a bottle 40 in the cradle structure 30. The sensor 72 can also be used to determine whether the bottle 40 is of a configuration which is authorized to be used in conjunction with the beverage dispensing system 10. Also shown in FIG. 4 is the sensor 76 which determines whether a vessel such as a glass is present beneath the nozzle 50. FIG. 4 also shows a bottle lock 78 which can be used to secure the bottle 40 in the cradle 30 and prevent unauthorized removal of the bottle 40.

Figure 5:
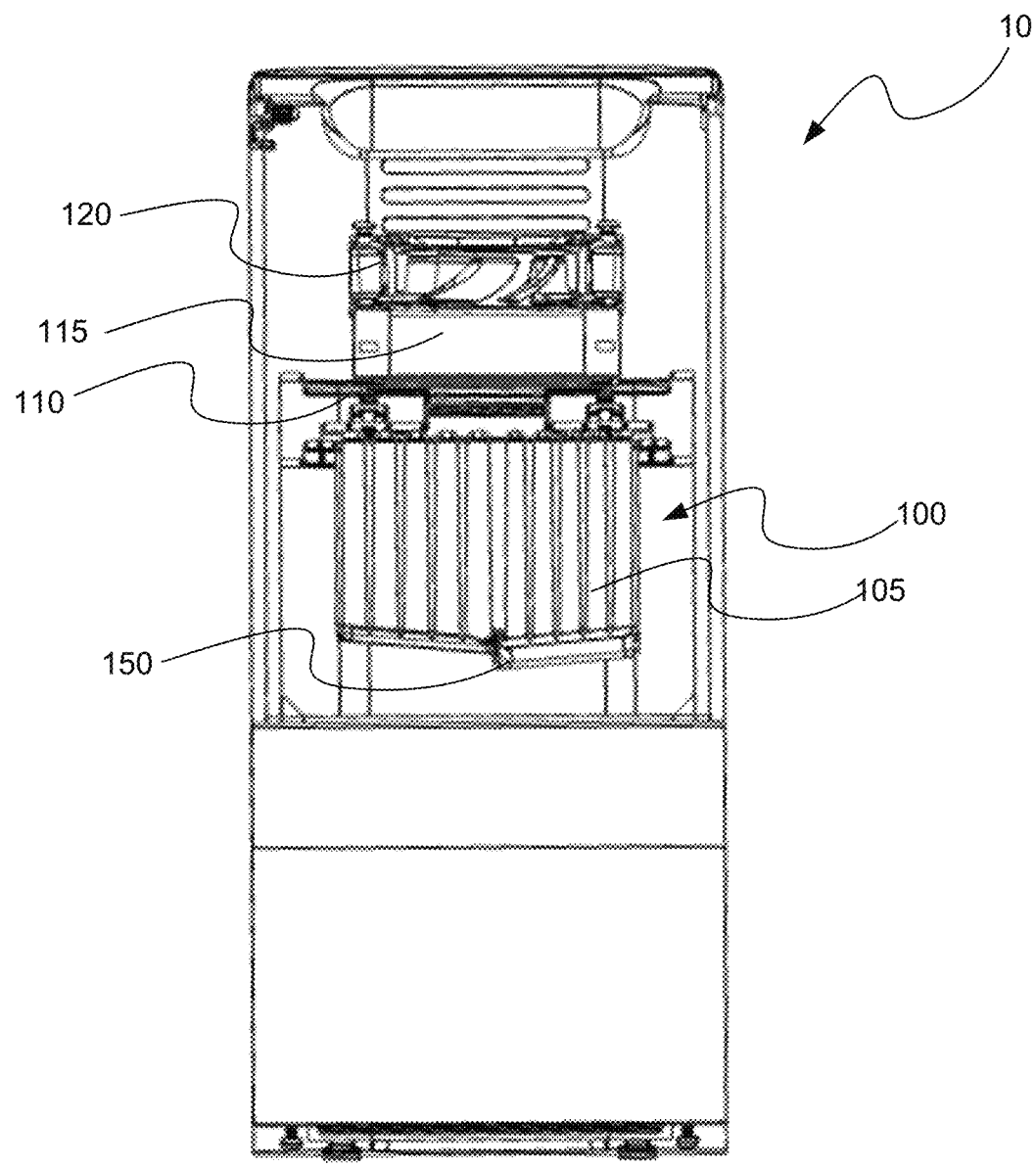
FIG. 5 is another cutaway view of a beverage dispensing system according to one aspect of an embodiment.

FIG. 5 is a cutaway view from the front through the heat exchanger 100, the temperature control element 110, and the heat sink 115. The temperature control element 110 is placed in thermal contact with the heat exchanger 100. The thermal control element 110 can be, for example, a thermoelectric cooling element. In such an embodiment, the heat exchanger 100 is used to cool liquid in the heat exchanger 100. The fan 120 vents waste heat out of vents on the back of the beverage dispensing system 10. The heat exchanger 100 includes a series of fins 105. Also, as described more fully below, the heat exchanger 100 is essentially divided into two zones, a first zone in which the liquid added from the bottle 40 is brought to a temperature substantially equal to a target temperature and a second zone in which the liquid that has been cooled is maintained at a temperature substantially the same as that a target temperature and is ready for dispensing. In this context, "substantially the same" means that the temperature is close enough that any difference in temperature would be unnoticeable to an individual ingesting the chilled liquid. Although the discussion above and which follows involves chilling a liquid as an example, it will be apparent to one of ordinary skill the art that the system may also be used to heat liquids to a desired temperature and make them available for dispensing.

Figure 6A:
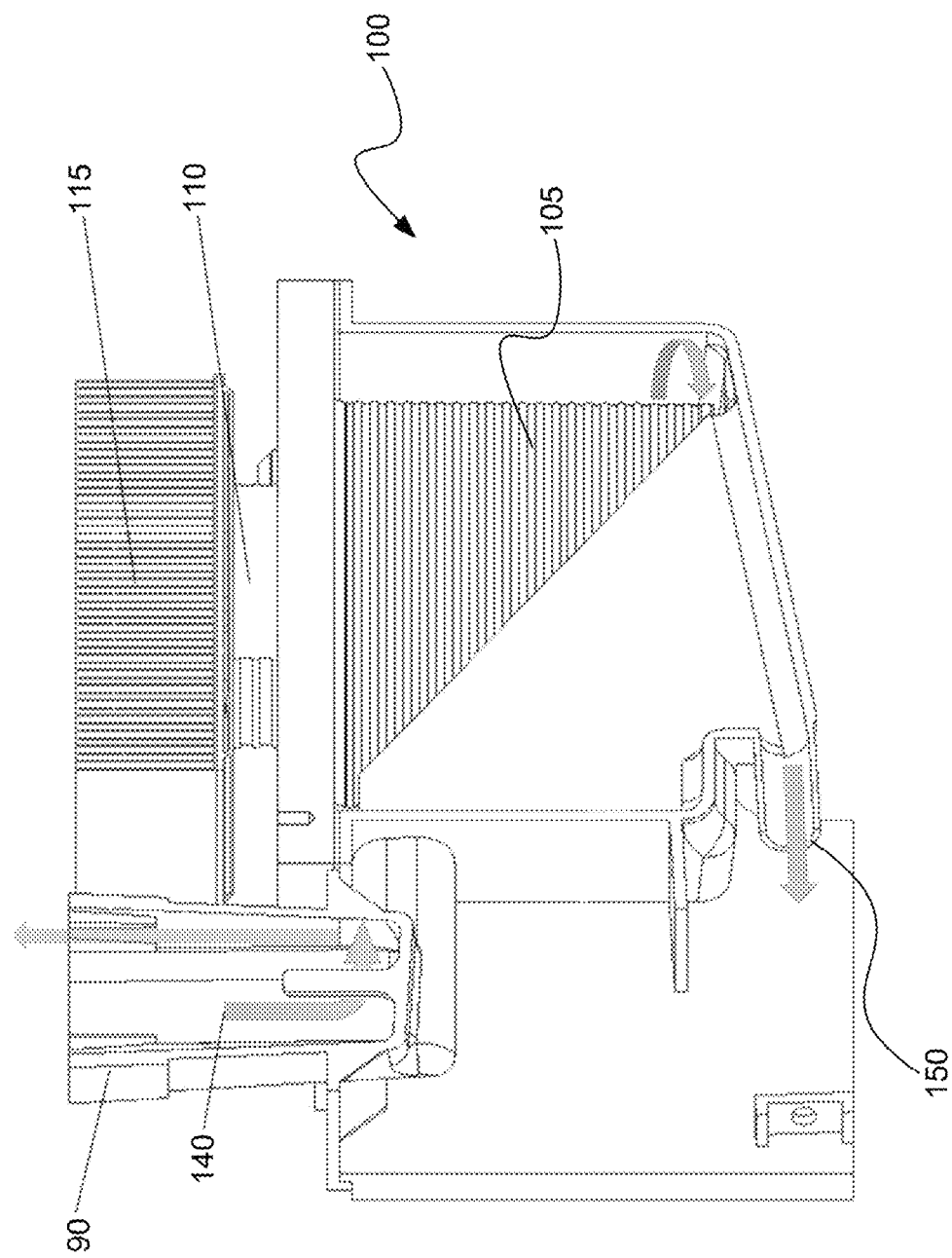
FIG. 6A is a cutaway view of a heat exchanger for a beverage dispensing system according to one aspect of an embodiment.

FIG. 6A shows more details of an example of one embodiment of a heat exchanger 100. The upper left portion of FIG. 6A shows the mating structure 90 and the inlet 140 to the heat exchanger 100. Also as shown in FIG. 6A, Liquid flows through the inlet 140 into the first zone 160 of the heat exchanger 100. The liquid then flows into a second zone 170 (see FIG. 7) which is in direct fluid communication with the liquid outlet 150. Liquid flow between the first zone 160 and the second zone 170 is restricted. In the embodiment shown, fluid flow between the first zone 160 and the second zone is restricted by separating wall 180 (see FIG. 7). The restricted flow creates a condition in which fluid must flow through a large portion of the first zone 160 before it reaches the second zone 170. Thus, while traversing the first zone 160 the liquid has sufficient dwell time in the first zone 160 achieves a temperature which is substantially the same as a target temperature and in the second zone 170 the liquid is maintained at the temperature substantially the same as target temperature. It will be noted that the bottom wall of the second zone 170 is sloped downward to promote flow from the second zone 170 to the liquid outlet 150.

Figure 6B:
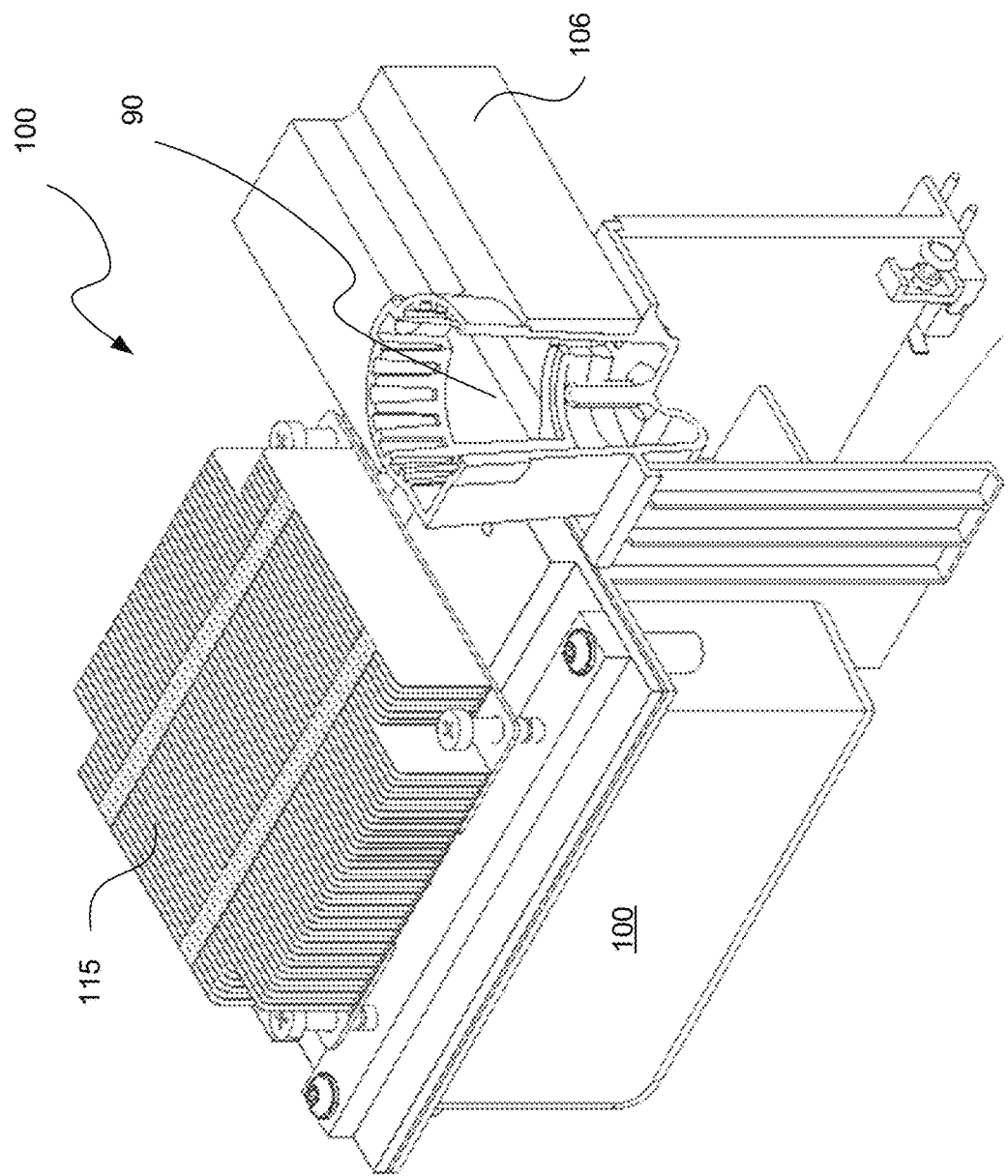
FIG. 6B is a cutaway view of a heat exchanger for a beverage dispensing system according to one aspect of an embodiment.

FIG. 6B shows an embodiment including a drain tank 106. When the bottle 40 is removed from the mating structure 90 and placed back in, the level in the tank 106 will increase slightly due to change in pressure in the bottle. The tank 106 allows the user to remove and place the bottle multiple times before it the tank 106 overflows. In an embodiment the tank 106 is made self-draining. In an embodiment the tank 106 is disposed horizontally and may have a volume in the range of 2 cl to 20 cl.

Figure 7:
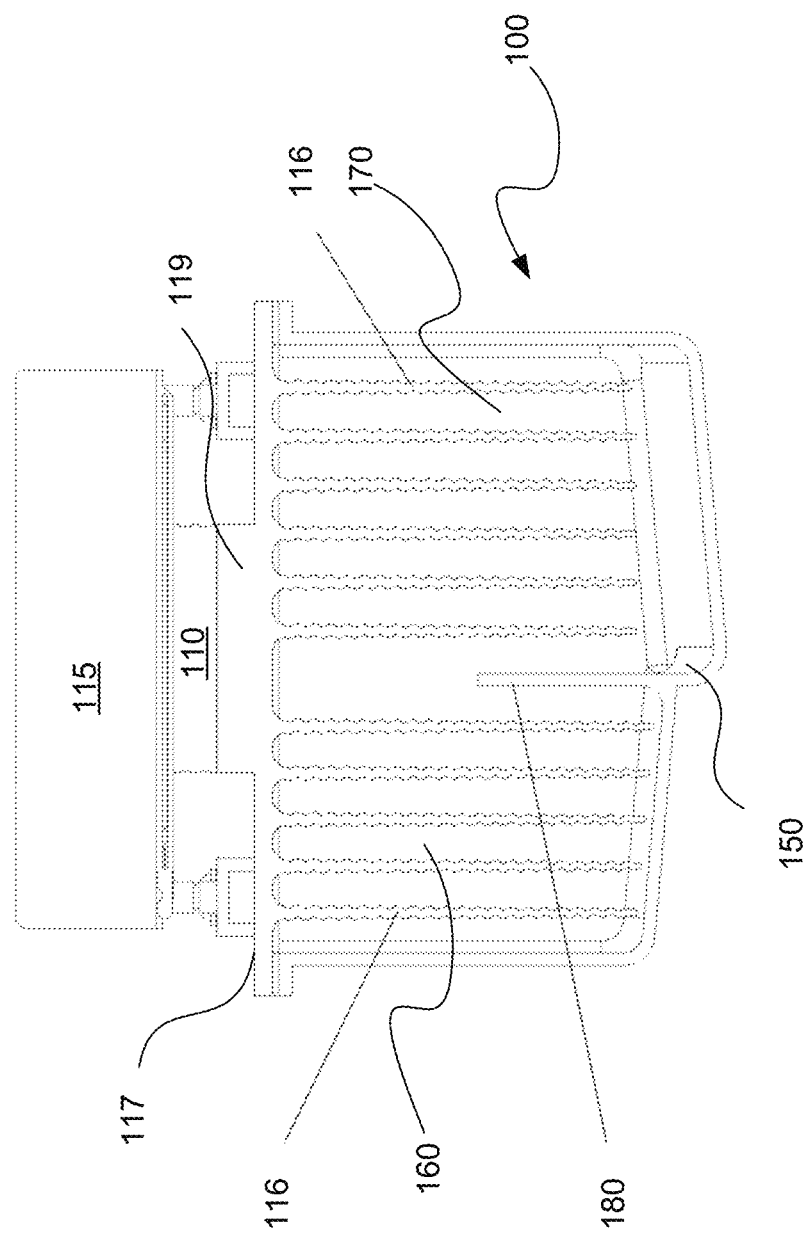
FIG. 7 is another cutaway view of a heat exchanger for a beverage dispensing system according to one aspect of an embodiment.

FIG. 7 is an end on cutaway view of an embodiment of a heat exchanger 100. As can be seen, the heat exchanger 100 is divided into two zones, a first zone 160 which is in fluid communication with the fluid inlet 140 (not visible FIG. 7) and a second zone 170 which is in fluid communication with the fluid outlet 150. A separating wall 180 restricts flow between the two zones such that fluid must traverse most of the first zone 160, the cooling zone, before reaching the second zone 170, the holding zone. Each of the zones contains a series of fins 116. The surfaces of the fins 116 are oriented vertically to promote drainage. Also, the fins 116 have corrugated surfaces to increase their surface area to exchange heat more efficiently with the liquid in the heat exchanger 100. The fins 116 make up part of a cold sink 117 having a raised portion 119 to increase the insulation thickness between cold and hot side of temperature control element 110.

Figure 8:
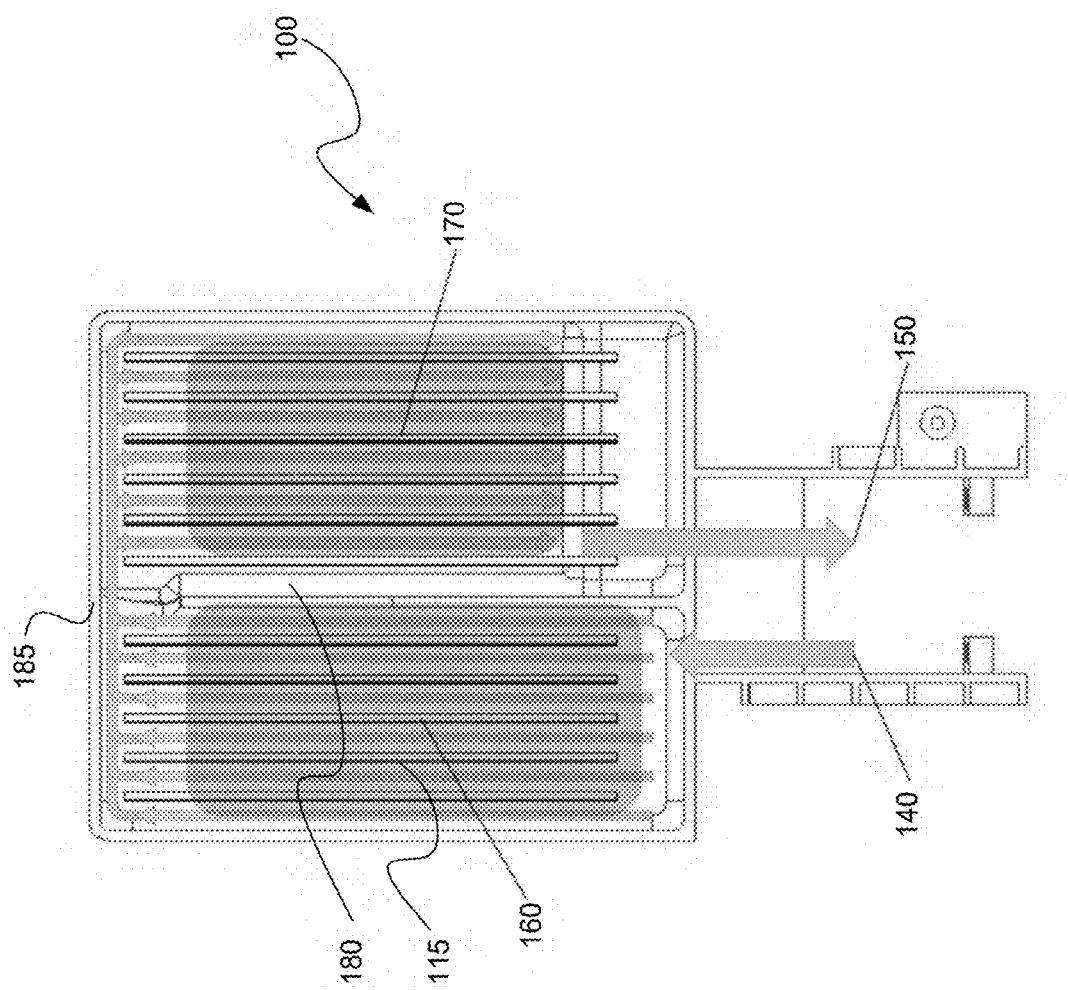
FIG. 8 is another cutaway view of a heat exchanger for a beverage dispensing system according to one aspect of an embodiment.

FIG. 8 is a diagram showing some principles of operation of the heat exchanger 100. A liquid flows into the heat exchanger 100 through the inlet 140. That fluid is introduced to a first zone 160 and flows in the flow pattern as indicated by the arrows. The fluid that flows past the fins 116 in the first zone 160 is cooled to the target temperature. The heat exchanger 100 also includes a second zone 170 which fluid passes into after it has traversed at least a portion of the first zone 160. The fluid in the second zone 170 exchanges heat with fins 116 to keep the fluid at the target temperature until it is dispensed through the outlet 150. The two zones are separated by a wall 180. A port in the form of a channel 185 which restricts flow between the first zone 160 and the second zone 170. In the embodiment shown, the first zone 160 and the second zone 170 have essentially the same volume with the entire heat exchanger having a volume in the range of 0.1 liters to two liters. It will be appreciated by one having ordinary skill in the art, however, that the volumes do not need to be the same. For example, the first zone 160 may have twice the volume of the second zone 170. Other volume ratios are possible such as a 3:2 and so on. In essence, the volume ratios are established to achieve the desired effect of having a first zone which brings the liquid to the desired temperature and a second zone which maintains the liquid at the desired temperature. At the same time, the second zone must have a sufficient volume to be able to provide an anticipated number of servings per unit time.

In the embodiments shown, there is a single thermal control element in thermal contact with both the first zone and the second zone. It will be apparent to one of ordinary skill in the art, however, that each zone could be provided with its own cooling element. This would provide another means of adjusting the relative cooling of the first zone and the second zone to achieve the desired result.

Figure 9:
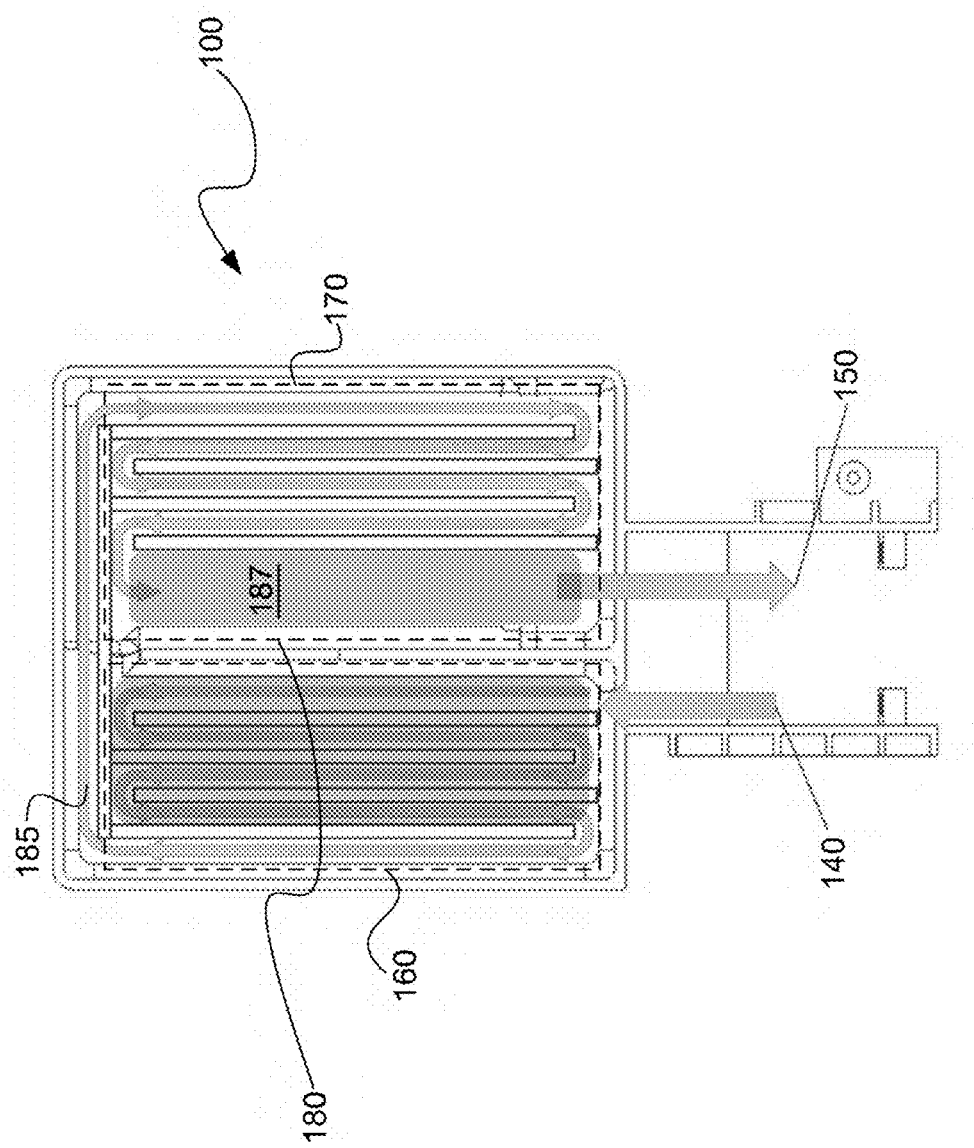
FIG. 9 is another cutaway view of a heat exchanger for a beverage dispensing system according to one aspect of an embodiment.

FIG. 9 shows another arrangement for the flow paths within the heat exchanger 100. In the arrangement of FIG. 9, fluid flows along a serpentine path past that the fins 116 in the first zone 160 in the flow pattern shown by the arrows and the liquid then flows to the second zone through the port 185 and follows a serpentine path and the second zone 170 until the liquid reaches an enlarged volume chamber 187 which is in direct fluid communication with the liquid outlet 150. The arrangement of FIG. 9 promotes relatively rapid dispensing of a larger amount of liquid.

Figure 10:
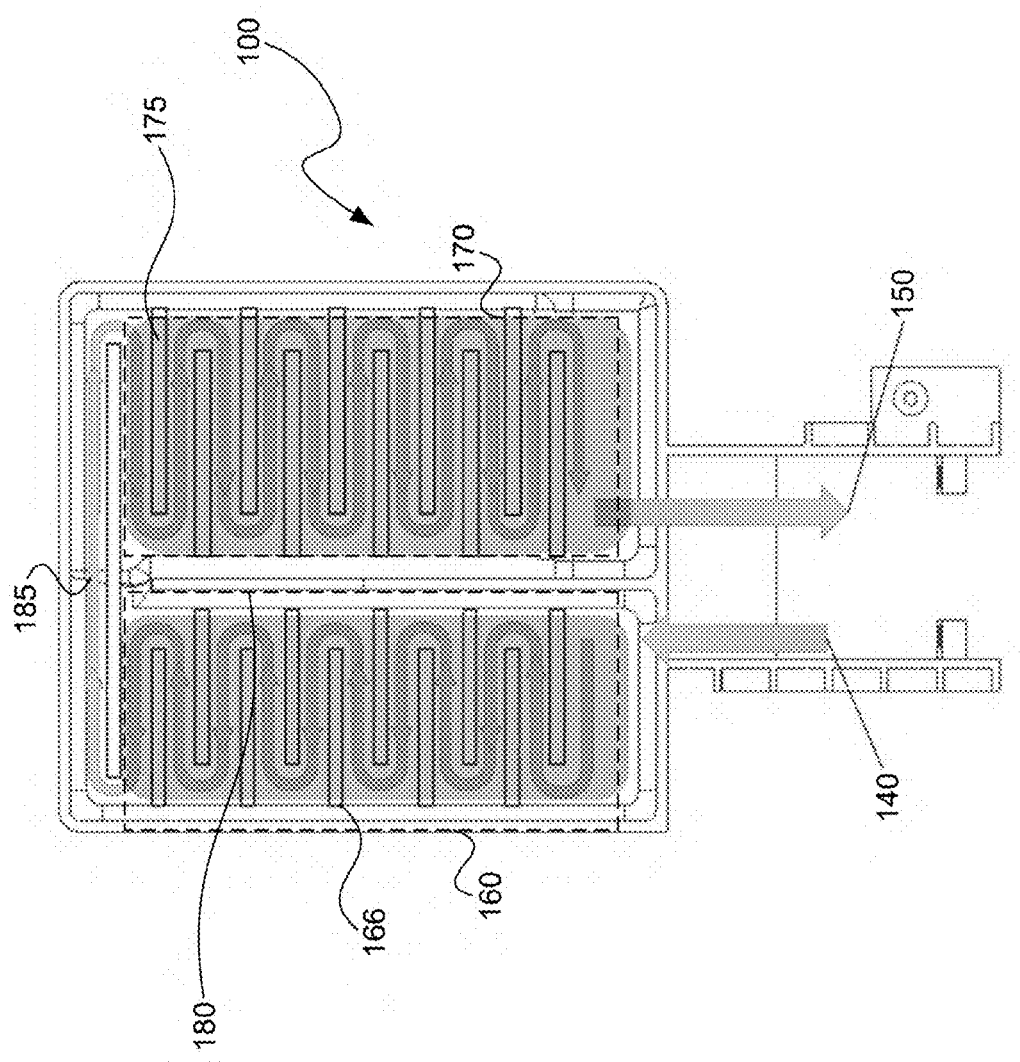
FIG. 10 is another cutaway view of a heat exchanger for a beverage dispensing system according to one aspect of an embodiment.

FIG. 10 shows yet another possible arrangement for a heat exchanger 100 in accordance with an aspect of an embodiment. A liquid flows into the liquid inlet 140 and into the first zone 160. The first zone 160 has a set of interdigitated fins 166 which are in thermal contact with the thermal control element 110 and together define a serpentine flow path as shown by the arrows. At the portion of the first zone 160 furthest from the fluid inlet 140 the liquid leaves the first zone 160 through orifice 185 and flows into the second zone 170. The fluid then flows through the second zone 170 through another set of interdigitated fins 175 that together define a serpentine path eventually leading to the liquid outlet 150.

At or near the cradle 30 there may be provided a sensor 72. In this context, "near" means sufficiently proximate that the sensor 72 can detect conditions in the cradle 30 as well as in a bottle 40 placed in the cradle 30. The sensor 72 may also include a physical condition sensor that can detect when a foreign object such as a finger has been inserted into the cradle 30.

Figure 11:
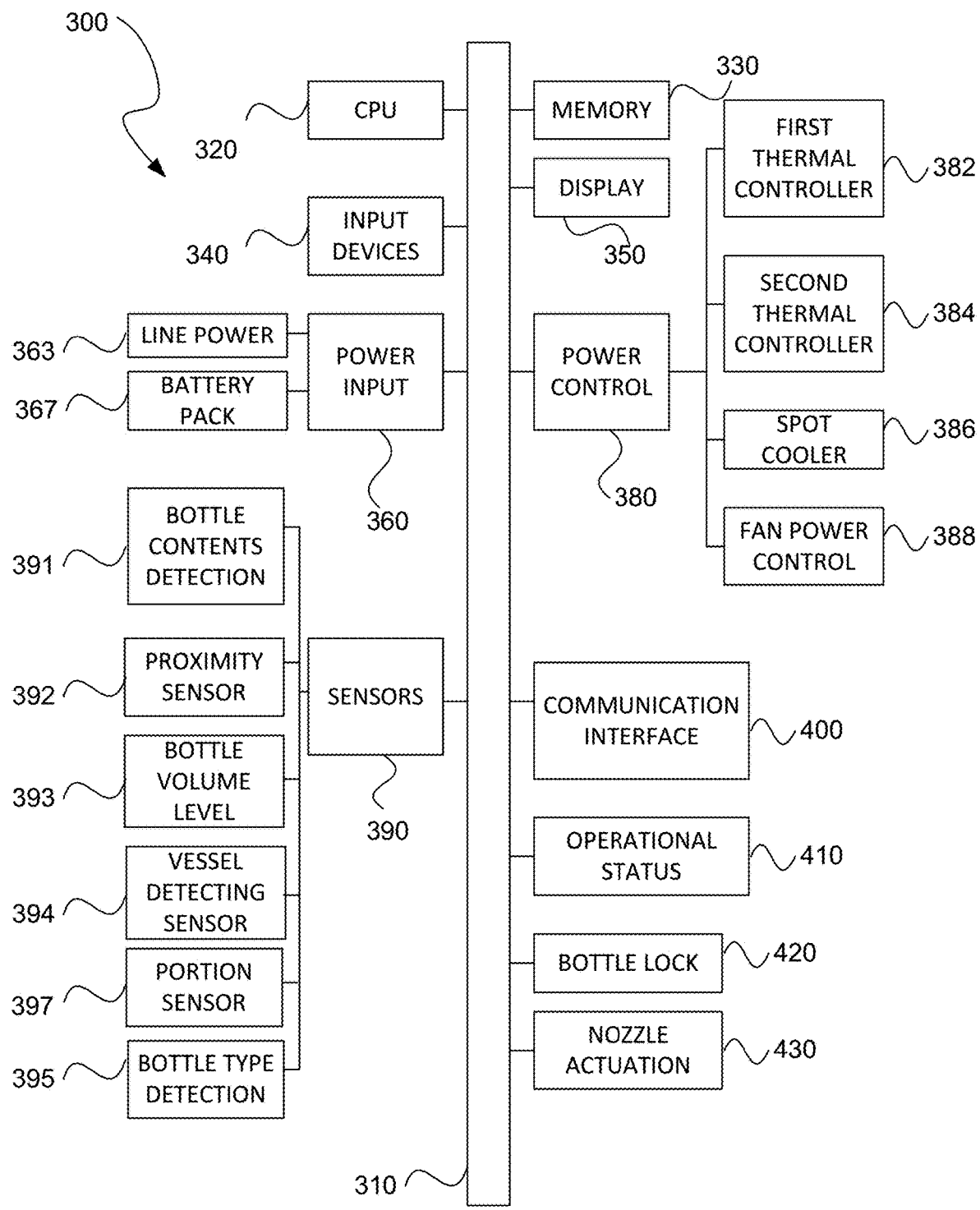
FIG. 11 is a circuit block diagram of a control system for a beverage dispensing system according to an aspect of an embodiment.

The various sensors described above make up part of an overall control system 300, one possible arrangement for which is included in the functional block diagram shown in FIG. 11. As shown, the control system 300 may include a suitably programmed CPU 320 and a memory 330 for storing instructions and data connected to one another by a bus 310. The control system 300 also includes the a communication interface 400. The communication interface 400 may be connected to one or more switches, sensors, displays, communication systems, and controllers. For example, a physical on/off switch may be connected to the communication interface 400. The control system 300 may also include sensors 390. For example, a tilt sensor which detects when the beverage dispensing system 10 has been tipped may be connected to the communication interface 400. A system status sensor 410 may also be connected to the bus 310.

The communication interface 400 may include any device for communicating data to or from the CPU 320 and an outside device. For example, the communications interface 400 may be a USB interface, or an Ethernet interface. The communications interface 400 may additionally or alternately include a wireless interface such a WiFi, Bluetooth, or an NFC interface.

The user interface 270 can also be implemented as software operating on a computer or as an application on a smart phone or tablet or other wireless communication device. To implement this, the communications interface 310 could be configured to interface with an external device 360 such as a wireless enabled device such as a computer, tablet, or cell phone. The user could use an application on the mobile device to control operation of the beverage chilling system 10. In a commercial establishment the external device 360 could be the establishment's vending system and the communications interface 310 could be configured to exchange data wirelessly with the establishment's vending system so as to create a record every time the beverage chilling system 10 is used. This could help reduce loss due to pilferage or excessive "comping" of patrons. If the external device 360 is a wireless enabled device such as a computer, tablet, or cell phone, an application could be installed on the external device 360 and the user interface for the application could, for example, be a visual representation of a display with controls.

The control system 300 may also include various control units such as a first thermal controller power control unit 382 for the first thermal controller and a second thermal controller power control unit 384 if a second thermal controller is used. The thermal controller power control units may use pulse width modulated control of the thermal controllers in which a duty cycle of pulses is used to control the average power supplied to the thermal controllers. The power controller 380 may also interface with a spot cooler controller 386 if one is present and a fan power control 388 electrically connected to control operation of the fan assembly 200. There may also be provision for reversing the polarity of the thermal control elements so that they heat rather than cool or vice versa. This could be useful if an excess amount of ice accumulates at the cradle 30 which may interfere with operation or even cause the bottle 40 to become trapped in the cradle 30.

The sensors may also include a proximity sensor 392 for determining the presence of a bottle 40 in the cradle 30 for energy optimization and/or safety shut-off. The sensors may also include a sensor 393 for sensing an amount or level of liquid in a bottle 40 inserted into the cradle 30 for example optically or by determining net weight, for example for measuring usage patterns. The bottle level may be indicated by an indicator, for example, a column of LEDs illuminated up to the same level as the sensed level in the bottle, or may be relayed to be read remotely, e.g., by Bluetooth or Wi-Fi to a control device such as a smart phone running an app.

In other words, as can be seen in FIG. 11, the control system 300 may include a suitably programmed CPU 320. The CPU 320 may be connected to a memory 330 through a standard interconnection such as bus 310. The memory 330 contains instructions and other data used by the CPU 320 to control operation of the beverage dispensing device 10. Also connected to the bus 310 are one or more input devices 340. These input devices 340 may include the touch screen described above or any other manual user interface devices used for controlling operation of the beverage dispensing system 10. Also connected the bus 310 may be one or more displays 350 which may include, for example, the light emitting diodes mentioned above. The displays 350 may include more complicated visual displays such as a small screen which may be a touch screen.

The CPU 320 is also capable of selecting between multiple power inputs through a power input unit 360 which, for example, may be connected to line power 363 or a battery pack 367. The CPU 320 may also be connected through the bus 310 to a power control unit 380 which controls provision of power to various other systems inside the beverage dispensing system 10. For example, the power controller 380 may supply power to the first thermal controller 382 in a controllable way. The power controller 380 may also supply power to a second thermal controller 384 if it is present, for example, to provide separate cooling and or heating to the first zone and second zone as described above. The power controller 380 may also provide power to the spot cooler 386 which would be positioned near the nozzle 50 in order to ensure that liquid leaving the dispenser is at the desired temperature when, for example, cooling the liquid. The power control unit 380 may also be connected to a fan power control which controls the speed at which the fans blow air through the heat sink to eliminate waste heat.

The CPU 320 may also be connected through the bus 310 to sensors 390 which include the various sensors described above. For example, the sensors 390 may include a bottle contents detection sensor 391 which determines one or more characteristics of the contents of the bottle inserted into the cradle 30. The sensors 390 may also include a proximity sensor 392 which detects when a bottle or a foreign object is placed in the cradle. The sensors 390 may also include a volume level detector 393 which may be used to determine an amount of liquid remaining in a bottle Inserted in the cradle 30. The sensors 390 may include a vessel detecting sensor 394 which determines when a vessel such as a glass is present underneath the nozzle 50, to, for example, prevent dispensing when a vessel is not present or also to provide for automatic operation upon introduction of a vessel into the space below the nozzle 50. The sensors 390 may also include a bottle type detection sensor 395 which determines whether a bottle being inserted into the cradle 30 is of a type that is authorized for use with the beverage dispensing system 10. The sensors 390 may also include a portion sensor 397 which determines an amount of liquid has been dispenses into a vessel.

The CPU 320 may also communicate with the bus 310 to a communication interface 400 which permits the beverage dispensing system 10 to communicate with external devices through any one of several remote data transfer protocols such as Wi-Fi, Bluetooth, NFC communications, and so forth. The beverage dispensing system 10 could communicate with external devices using these protocols, for example, provide for remote control of the beverage dispensing system 10, to provide usage data on the number of servings dispensed by the beverage dispensing system 10, and when they were dispensed, Possibly along with information on the physical location of the beverage dispensing unit provided by a Global Positioning System receiver which may be included also be included within the beverage dispensing system 10.

The CPU 320 may also be connected by the bus 310 to an operational status sensor 410 to determine, for example, operational temperature, an amount of time the device has been operated for purposes of scheduling maintenance, a tilt sensor, and so on. The CPU 320 may also be connected through the bus 310 to the bottle lock 420 described above which can lock a bottle 40 in the cradle 30 to prevent unauthorized removal of the bottle 40 from the cradle 30. Also, the CPU 320 may be connected via the bus 310 to a nozzle actuation unit 430 which could be used to activate the nozzle 50 based on the presence of a vessel in the area below the nozzle 50 without the need for operator to make physical contact with an actuator.

Figure 12:
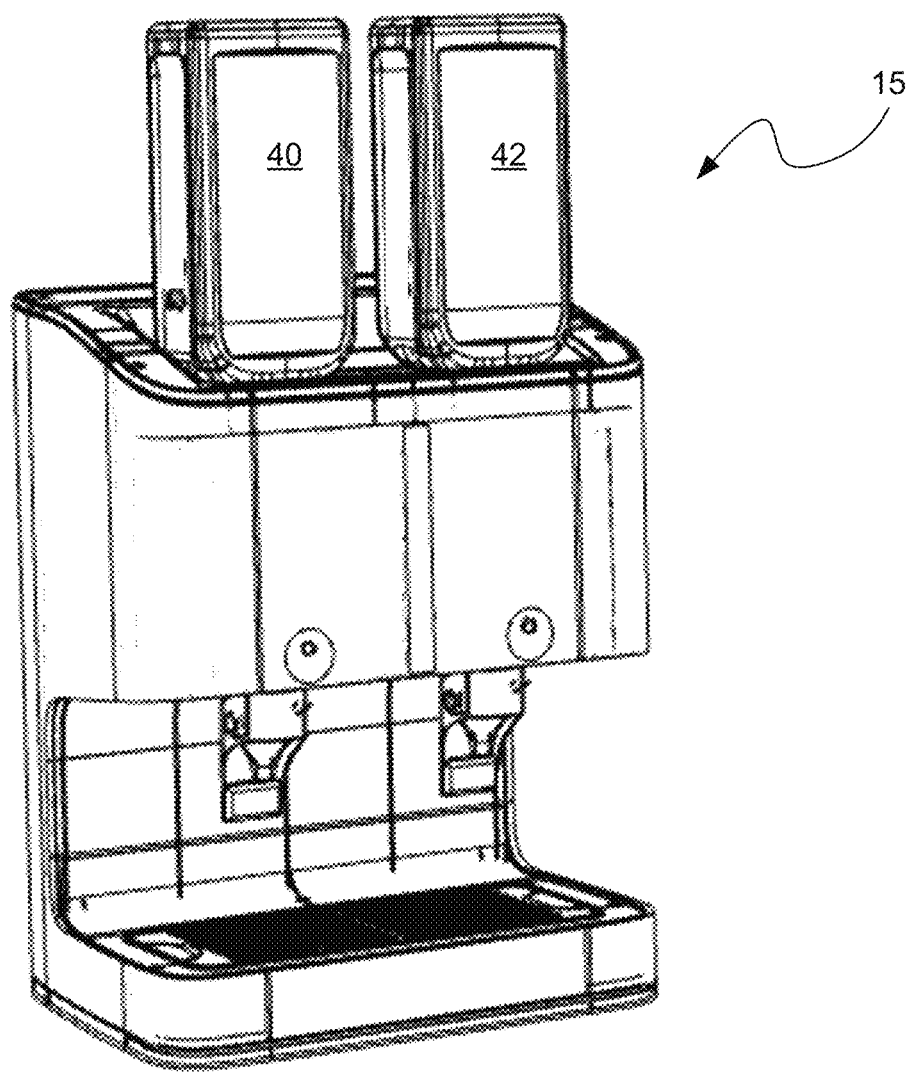
FIG. 12 is a perspective view of a beverage dispensing system according to another aspect of an embodiment.

The arrangement of components as described above permits a relatively compact beverage dispensing system having relatively small footprint. It permits provision of a dispenser which can hold and dispense from more than one bottle such as shown in FIG. 12. As shown in FIG. 12, in a dual beverage dispensing system 15 holds the two bottles 40 and 42 may be placed side by side. The bottles may be of the same type or may be of different types holding different types of liquids. In the embodiment shown, each cradle would be provided with its own heat exchanger and thermal control element.

The above description includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. Apparatus for dispensing a liquid, the apparatus comprising:
   a housing including
      a cradle structure adapted to receive a container containing the liquid and
      an inlet in the cradle structure arranged to receive liquid from the container;
   an outlet arranged to dispense the liquid from the housing;
   a heat exchanger arranged within the housing and divided into a first zone and a second zone with the first zone being in fluid communication with the inlet and the second zone being in fluid communication with the outlet, the first zone being in limited fluid communication with the second zone; and
   a temperature control element in thermal communication with the first zone and with the second zone,
   the first zone being adapted to alter a temperature of the liquid in the first zone to a temperature substantially equal to a target temperature and the second zone being adapted to maintain the liquid from the first zone at the temperature substantially equal to the target temperature.

2. The apparatus as claimed in claim 1 wherein the first zone is in limited fluid communication with the second zone through a single port between the first zone and the second zone and wherein the first zone comprises a plurality of parallel fins with adjacent pairs of fins defining channels open at both ends therebetween to define a plurality of parallel channels directing liquid in the first zone from the inlet to the single port in parallel.

3. The apparatus as claimed in claim 2 wherein the second zone comprises a second plurality of parallel fins with adjacent pairs of fins defining channels open at both ends therebetween to define a second plurality of parallel channels directing liquid in the second zone from the single port to the outlet in parallel.

4. The apparatus as claimed in claim 1 wherein the first zone is in limited fluid communication with the second zone through a single port between the first zone and the second zone and wherein the first zone comprises a plurality of parallel fins with adjacent pairs of fins defining channels therebetween to define a plurality of channels directing liquid in the first zone from the inlet to the single port, with a first channel communicating with the inlet, a second channel communicating with the single port, a plurality of intervening channels communicating only with an adjacent channel to define a serpentine path.

5. The apparatus as claimed in claim 4 wherein the second zone comprises a second plurality of parallel fins with adjacent pairs of fins defining channels therebetween to define a second plurality of channels directing liquid in the second zone from the single port to the outlet, with a first channel communicating with the single port, a second channel communicating with the outlet, and a plurality of intervening channels communicating only with an adjacent channel to define a serpentine path.

6. The apparatus as claimed in claim 1 wherein the first zone is in limited fluid communication with the second zone through a single port between the first zone and the second zone and wherein the first zone comprises a first set of fins arranged parallel to one another and perpendicular to a direction of flow from the inlet, and a second set of fins arranged parallel to one another and perpendicular to a direction of flow from the inlet, the first set and the second set being interdigitated to form a serpentine path between the inlet and the single port.

7. The apparatus as claimed in claim 6 wherein the second zone comprises a third set of fins arranged parallel to one another and perpendicular to a direction of flow out of the outlet, and a fourth set of fins arranged parallel to one another and perpendicular to a direction of flow out of the outlet, the third set and the fourth set being interdigitated to form a serpentine path between the single port and the outlet.

8. The apparatus as claimed in claim 1 wherein the heat exchanger comprises a plurality of fins having corrugated surfaces to increase a surface area of the fins.

9. The apparatus as claimed in claim 1 further comprising a spot cooling thermoelectric cooling element in thermal communication with the outlet to provide directed cooling of liquid exiting the outlet.

10. The apparatus as claimed in claim 1 wherein a ratio of an internal volume of the first zone to an internal volume of the second zone is 1:1.

11. The apparatus as claimed in claim 1 wherein a ratio of an internal volume of the first zone to an internal volume of the second zone is 3:2.

12. The apparatus as claimed in claim 1 wherein the inlet is arranged at a position above and aligned with the outlet, the inlet and the outlet together defining a first vertical axis, wherein the temperature control element comprises a first temperature control element and a second temperature control element arranged vertically in a stack having a second vertical axis parallel to the first vertical axis.

13. The apparatus as claimed in claim 1 wherein the outlet comprises a lever adapted to be operable with one hand.

14. The apparatus as claimed in claim 1 wherein the outlet comprises a lever having an elastic pad.

15. The apparatus as claimed in claim 1 wherein the outlet comprises a removable tap system.

16. The apparatus as claimed in claim 1 further comprising a volume detector arranged to detect a detected volume of liquid in a container inserted into the cradle and an indicator adapted to provide an indication of the detected volume.

17. The apparatus as claimed in claim 1 further comprising a temperature detector arranged to detect a detected temperature of liquid in the second zone and an indicator adapted to provide an indication of the detected temperature.

18. The apparatus as claimed in claim 1 further comprising an operational status detector arranged to detect a detected operational status of the apparatus and an indicator adapted to provide an indication of the detected operational status.

19. The apparatus as claimed in claim 1 further comprising a data collection module adapted to gather and store data pertaining to operational parameters of the apparatus and a communications module arranged to receive data from the data collection module and adapted to communicate the data to an external device.

20. The apparatus as claimed in claim 1 further comprising a communications module arranged to receive control data from an external device.

21. The apparatus as claimed in claim 1 further comprising a touch sensitive panel for inputting control data.

22. The apparatus as claimed in claim 1 wherein the outlet further comprises an electronically controlled valve for controlling an amount of liquid dispensed with each actuation of the outlet.

23. The apparatus as claimed in claim 1 wherein the outlet further comprises a sensor adapted to detect a presence of a vessel for receiving the liquid and wherein the outlet is adapted to not dispense liquid unless a vessel is present.

24. The apparatus as claimed in claim 1 wherein the outlet further comprises a sensor adapted to detect a presence of a vessel for receiving the liquid and wherein the outlet is adapted to dispense liquid automatically upon detecting the vessel.

25. The apparatus as claimed in claim 1 further comprising a fan arranged to cool at least one of the first temperature control element and the second temperature control element.

26. The apparatus as claimed in claim 25 further comprising an air inlet for the fan including a first set of fins and an air outlet for the fan including a second set of fins wherein fins of the first set of fins are at an angle with respect to fins of the second set of fins.

27. The apparatus as claimed in claim 1 wherein the outlet comprises an electrically actuated valve adapted to be closed when not supplied with power.

28. The apparatus as claimed in claim 1 wherein the housing comprises a thermally insulating material.

29. The apparatus as claimed in claim 28 wherein the thermally insulating material comprises a plastic material.

30. The apparatus as claimed in claim 1 wherein the second zone has a bottom surface, the bottom surface being sloped to promote more complete drainage of the second zone.

31. The apparatus as claimed in claim 1 further comprising a sensor for sensing a type of liquid in a container inserted in the cradle.

32. The apparatus as claimed in claim 31 wherein the sensor comprises an IR sensor.

33. The apparatus as claimed in claim 1 further comprising a horizontal drain tank in fluid communication with the cradle structure.

34. Apparatus for dispensing a liquid, the apparatus comprising:

a housing including
a cradle structure adapted to receive a container containing the liquid and
an inlet in the cradle structure arranged to receive liquid from the container;

an outlet arranged to dispense the liquid from the housing;

a heat exchanger arranged within the housing and divided into a first zone and a second zone with the first zone being in fluid communication with the inlet and the second zone being in fluid communication with the outlet, the first zone being in limited fluid communication with the second zone; and a temperature control element in thermal communication with the first zone and with the second zone, the first zone being adapted to alter a temperature of the liquid in the first zone to a temperature substantially equal to a target temperature and the second zone being adapted to maintain the liquid from the first zone at the temperature substantially equal to the target temperature, wherein the first zone is in limited fluid communication with the second zone through a single port between the first zone and the second zone and wherein the first zone comprises a plurality of parallel fins with adjacent pairs of fins defining channels open at both ends therebetween to define a plurality of parallel channels directing liquid in the first zone from the inlet to the single port in parallel, further comprising a temperature detector arranged to detect a detected temperature of liquid in the second zone and an indicator adapted to provide an indication of the detected temperature.

* * * * *